United States Patent
Le Chevalier et al.

(10) Patent No.: US 11,741,290 B2
(45) Date of Patent: Aug. 29, 2023

(54) AUTOMATED TESTING MATERIALS IN ELECTRONIC DOCUMENT PUBLISHING

(71) Applicant: Chegg, Inc., Santa Clara, CA (US)

(72) Inventors: Vincent Le Chevalier, Waikoloa, HI (US); Charles F. Geiger, Santa Clara, CA (US)

(73) Assignee: Chegg, Inc., Santa Clara, CA (US)

( * ) Notice: Subject to any disclaimer, the term of this patent is extended or adjusted under 35 U.S.C. 154(b) by 292 days.

(21) Appl. No.: 17/147,625

(22) Filed: Jan. 13, 2021

(65) Prior Publication Data

US 2021/0150120 A1      May 20, 2021

Related U.S. Application Data

(63) Continuation of application No. 16/898,376, filed on Jun. 10, 2020, now Pat. No. 10,929,594, which is a
(Continued)

(51) Int. Cl.
  *G06F 40/106*      (2020.01)
  *G06F 16/25*       (2019.01)
  (Continued)

(52) U.S. Cl.
  CPC .......... *G06F 40/106* (2020.01); *G06F 16/254* (2019.01); *G06F 16/958* (2019.01);
  (Continued)

(58) Field of Classification Search
  None
  See application file for complete search history.

(56) References Cited

U.S. PATENT DOCUMENTS

| | | |
|---|---|---|
| 5,822,720 A | 10/1998 | Bookman et al. |
| 5,827,070 A | 10/1998 | Kershaw et al. |
| | (Continued) | |

FOREIGN PATENT DOCUMENTS

| | | |
|---|---|---|
| EP | 2344038 A2 | 7/2011 |
| KR | 100953166 B1 | 4/2010 |
| WO | 2011145848 A3 | 1/2012 |

OTHER PUBLICATIONS

Rosson et al., "wConnect: A Facebook-Based Developmental Learning Community to Support Women in Information Technology" C&T'09, Jun. 25-27, 2009, University Park, Pennsylvania, USA, ACM, pp. 125-134. (Year: 2009).*

(Continued)

*Primary Examiner* — Amelia L Tapp
(74) *Attorney, Agent, or Firm* — Morgan, Lewis & Bockius LLP; Manita Rawat

(57) ABSTRACT

A testing materials production system generates a testing document associated with an electronic foundation document. The testing materials production system automatically generates the testing document by populating regions of a template with testing elements extracted from the electronic document. User customizations of the testing document are received, and the testing document is published to an extended catalog database associated with the electronic document. Regions of the testing document may be delivered in association with the electronic document to designated recipients via browser applications executing on computing devices of the recipients.

18 Claims, 10 Drawing Sheets

Related U.S. Application Data continuation of application No. 16/151,706, filed on Oct. 4, 2018, now Pat. No. 10,713,415, which is a continuation of application No. 13/898,377, filed on May 20, 2013, now Pat. No. 10,108,585.

(60) Provisional application No. 61/733,728, filed on Dec. 5, 2012.

(51) Int. Cl.
| | | |
|---|---|---|
| *G06F 16/958* | (2019.01) | |
| *G06F 40/58* | (2020.01) | |
| *G06F 40/242* | (2020.01) | |
| *G06F 40/186* | (2020.01) | |
| *G06F 40/103* | (2020.01) | |
| *G06F 21/44* | (2013.01) | |

(52) U.S. Cl.
CPC ............ *G06F 21/44* (2013.01); *G06F 40/103* (2020.01); *G06F 40/186* (2020.01); *G06F 40/242* (2020.01); *G06F 40/58* (2020.01)

(56) References Cited

U.S. PATENT DOCUMENTS

| | | |
|---|---|---|
| 6,112,049 A | 8/2000 | Sonnenfeld |
| 6,275,610 B1 | 8/2001 | Hall et al. |
| 6,523,001 B1 | 2/2003 | Chase |
| 6,585,778 B1 | 7/2003 | Hind et al. |
| 6,725,399 B1 | 4/2004 | Bowman |
| 6,826,727 B1 | 11/2004 | Mohr et al. |
| 7,050,753 B2 | 5/2006 | Knutson |
| 7,418,652 B2 | 8/2008 | Ornstein et al. |
| 7,580,831 B2 | 8/2009 | Haskell et al. |
| 7,631,254 B2 | 12/2009 | Layard et al. |
| 7,945,527 B2 | 5/2011 | Michelin |
| 8,380,493 B2 | 2/2013 | Chronister et al. |
| 8,666,961 B1 | 3/2014 | Qureshi et al. |
| 8,931,056 B2 | 1/2015 | Fleischman et al. |
| 9,197,660 B2 | 11/2015 | Sun et al. |
| 9,282,100 B2 | 3/2016 | Clark et al. |
| 9,971,741 B2 | 5/2018 | Chevalier et al. |
| 10,572,498 B2 | 2/2020 | Silverstein et al. |
| 2002/0034720 A1 | 3/2002 | McManus et al. |
| 2002/0059339 A1 | 5/2002 | McCormick et al. |
| 2002/0143818 A1 | 10/2002 | Roberts et al. |
| 2003/0074559 A1 | 4/2003 | Riggs |
| 2003/0146977 A1 | 8/2003 | Vale et al. |
| 2003/0163784 A1 | 8/2003 | Daniel et al. |
| 2004/0018479 A1 | 1/2004 | Pritchard et al. |
| 2004/0161723 A1 | 8/2004 | Helfenbein |
| 2004/0161728 A1 | 8/2004 | Benevento et al. |
| 2004/0191744 A1 | 9/2004 | Guirguis |
| 2004/0221013 A1 | 11/2004 | Timbadia et al. |
| 2004/0229199 A1 | 11/2004 | Ashley et al. |
| 2005/0208461 A1 | 9/2005 | Krebs et al. |
| 2006/0048096 A1 | 3/2006 | Jiang et al. |
| 2006/0277080 A1 | 12/2006 | DeMartine et al. |
| 2007/0048723 A1 | 3/2007 | Brewer et al. |
| 2007/0099161 A1 | 5/2007 | Krebs et al. |
| 2007/0105080 A1 | 5/2007 | Hersh |
| 2008/0021886 A1 | 1/2008 | Wang-Aryattanwanich et al. |
| 2008/0133591 A1 | 6/2008 | Bookman et al. |
| 2008/0141182 A1 | 6/2008 | Bareness et al. |
| 2008/0147646 A1 | 6/2008 | Jaschek et al. |
| 2008/0293033 A1 | 11/2008 | Scicchitano et al. |
| 2009/0031402 A1 | 1/2009 | Jung et al. |
| 2009/0055378 A1 | 2/2009 | Alecu et al. |
| 2009/0089654 A1 | 4/2009 | Wittig et al. |
| 2009/0135164 A1 | 5/2009 | Kyung et al. |
| 2009/0144614 A1 | 6/2009 | Dresevic et al. |
| 2009/0240671 A1 | 9/2009 | Torres et al. |
| 2009/0313347 A1 | 12/2009 | Engel et al. |
| 2010/0004977 A1 | 1/2010 | Marci et al. |
| 2011/0016550 A1 | 1/2011 | Hertzberg et al. |
| 2011/0045452 A1 | 2/2011 | Bejar et al. |
| 2011/0087956 A1 | 4/2011 | Sherman et al. |
| 2011/0165550 A1 | 7/2011 | Jang |
| 2011/0223576 A1 | 9/2011 | Foster et al. |
| 2011/0236873 A1 | 9/2011 | Bowers |
| 2012/0077177 A1 | 3/2012 | Foster et al. |
| 2012/0233534 A1 | 9/2012 | Vanderwende et al. |
| 2013/0084554 A1 | 4/2013 | Shah et al. |
| 2013/0088511 A1 | 4/2013 | Mitra et al. |
| 2013/0103686 A1 | 4/2013 | Sisneros |
| 2013/0151539 A1 | 6/2013 | Shi et al. |
| 2013/0185774 A1 | 7/2013 | Morelli |
| 2013/0224718 A1 | 8/2013 | Woodward |
| 2013/0232474 A1 | 9/2013 | Leclair et al. |
| 2014/0004497 A1 | 1/2014 | Wong et al. |
| 2014/0024008 A1 | 1/2014 | Sathy |
| 2014/0051054 A1 | 2/2014 | Wong et al. |
| 2014/0120511 A1 | 5/2014 | Hall |
| 2014/0120516 A1 | 5/2014 | Chiang et al. |
| 2017/0019421 A1 | 1/2017 | Hebert et al. |

OTHER PUBLICATIONS

Hamalainen et al., "Electronic Markets for Learning: Education Brokerages on the Internet," Communications of the ACM Jun. 1996/vol. 39, No. 6, pp. 51-58. (Year: 1996).*

Jaligama et al., "An Online Virtual Learning Environment for Higher Education," 2011 Third International Conference on Games and Virtual Worlds for Serious Applications, copyright 2011 IEEE, p. 207-214. (Year: 2011).

Office Action for U.S. Appl. No. 13/935,150, filed Apr. 13, 2015, 15 Pages.

Office Action for U.S. Appl. No. 13/935,150, filed Dec. 24, 2015, 18 Pages.

Office Action for U.S. Appl. No. 13/935,150, filed Mar. 14, 2017, 18 Pages.

Patent Cooperation TreatyInternational Search ReportPCT/US2013/072879 dated March 28, 2014, 9 Pages.

Patent Cooperation TreatyInternational Search ReportPCT/US2013/072880.

PCT International Search ReportInternational application No. PCT/US2013/072879.

Qian et al., "Automated Testing and Smart Tutoring System for Web Application," 2008 International Workshop on Education Technology and Training & 2008 International Workshop on Geoscience and Remote Sensing, copyright 2008 IEEE, p. 582-585. (Year: 2008).

Walczak et al., "Dynamic creation of interactive mixed reality presentations," VRST '05, Nov. 2005, USA, copyright 2005 ACM, p. 167-176. (Year 2005).

* cited by examiner

Page-Based Template Content Sources
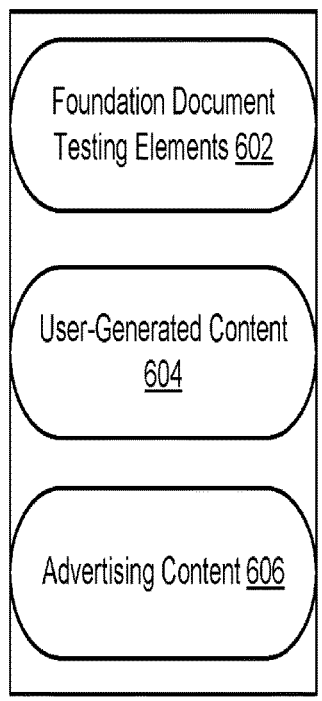
Page-Based Template Region Formats
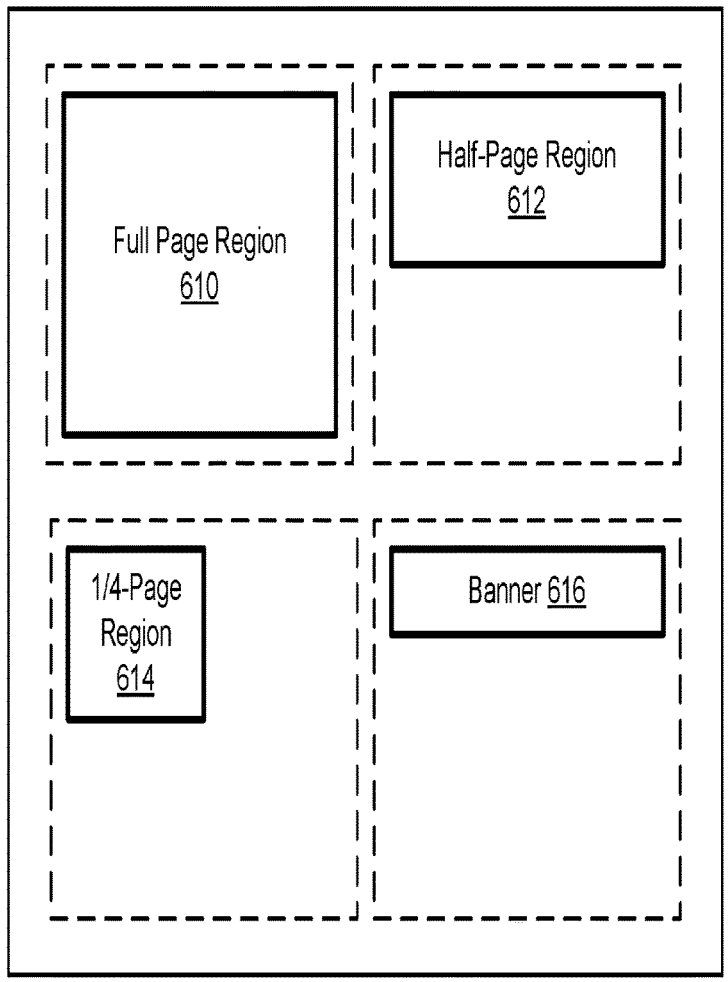
FIG. 6A
FIG. 6B

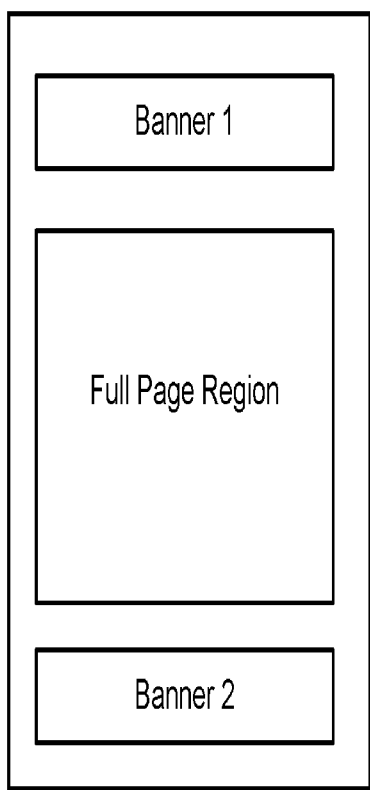
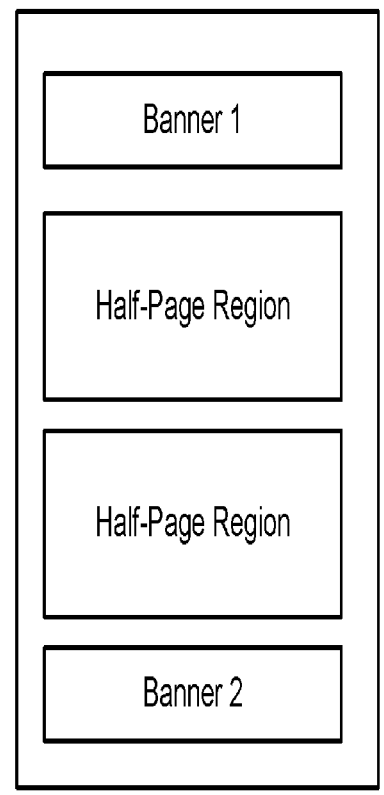
FIG. 6C
FIG. 6D

AUTOMATED TESTING MATERIALS IN ELECTRONIC DOCUMENT PUBLISHING

CROSS REFERENCE TO RELATED APPLICATIONS

This application is a continuation of U.S. application Ser. No. 16/898,376, filed on Jun. 10, 2020, now U.S. Pat. No. 10,929,594, which is a continuation of U.S. application Ser. No. 16/151,706, filed on Oct. 4, 2018, now U.S. Pat. No. 10,713,415, which is a continuation of U.S. application Ser. No. 13/898,377, filed on May 20, 2013, now U.S. Pat. No. 10,108,585, which claims the benefit of U.S. Provisional Application No. 61/733,728, filed on Dec. 5, 2012, each of which is incorporated herein by reference in its entirety.

BACKGROUND

Field of the Invention

This invention relates to automated production of testing materials associated with electronic documents.

Description of the Related Art

The rapid shift to mobile Internet services is bringing content offerings to an increasingly larger number of connected devices. Experiences previously limited to a single device are now accessible across multiple devices as high volume consumer electronic platforms such as Smart Phones, tablets, eReaders, game systems, and Internet TVs have become new channels to receive digital documents and services. Popular electronic book services leverage standardized publishing formats to seamlessly integrate and synchronize digital document reading experiences across consumer devices.

As digital documents are shifting from a static model to a connected one where related, personalized, and other social content are being aggregated dynamically within the original document, it becomes strategic for publishing platforms and their distribution systems to be able to properly author and manage these new individual content layers among a plurality of users. But while providing excellent user reading experience for this new digital medium remains a focus of the commercially available eReading systems and applications, it has been so far much more difficult to fully integrate other related reading activities, such as testing. In addition, as new digital content services are progressively embedded within the original document, it becomes increasingly difficult to create, edit, and organize these additional content layers into a unified reading experience.

SUMMARY

A testing materials production system generates a testing document associated with an electronic foundation document. In one embodiment, the testing materials production system generates the testing document by populating regions of a user-selected template with testing elements extracted from or associated with the electronic foundation document. The user may customize the testing document generated by the testing materials production system by rearranging the regions of the testing document, adding or removing content, designating recipients of the regions of the testing document, and specifying delivery conditions for the regions. The testing materials production system publishes the customized testing document to an extended catalog database associated with the electronic foundation document, where it can be distributed to the designated recipients at the specified time.

In one embodiment, the testing elements are terms and definitions extracted from a glossary of the electronic document (referred to herein as "primary terms"). The testing elements may also comprise terms and definitions extracted from content related to the electronic document but not occurring in the glossary (referred to herein as "secondary terms"). Testing elements may further comprise user-generated content, such as user-generated notes.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 6A illustrates examples of content sources supported by templates for testing documents, according to one embodiment.

FIG. 6B illustrates examples of region formats supported by templates for testing documents, according to one embodiment.

FIGS. 6C-D illustrate example template layouts, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
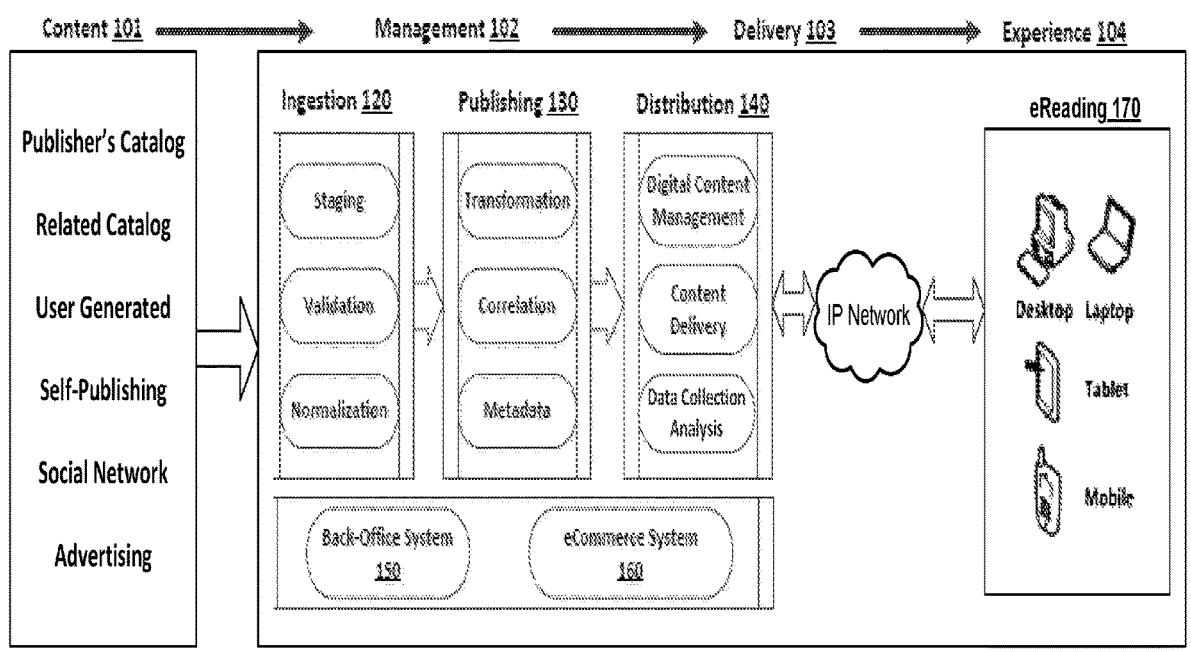
FIG. 1 illustrates an example publishing platform, according to one embodiment.

Embodiments of the invention provide a method for generating automated testing materials associated with an HTML document. The method is organized around an educational digital publication and reading platform configured to aggregate, manage, and distribute multilayered content. FIG. 1 is a high-level block diagram illustrating the platform environment, organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 2.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading activities, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Document Reconstruction

The publishing system 130 receives original documents for reconstruction from the ingestion system 120 illustrated in FIG. 1. In one embodiment, a series of modules of the publishing system 130 are configured to perform the document reconstruction process.

Figure 2:
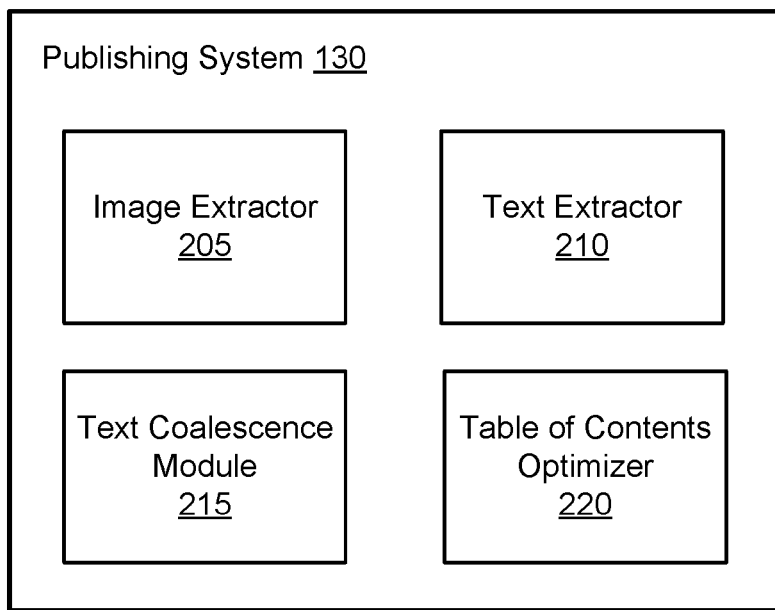
FIG. 2 is a block diagram illustrating modules within a publishing system, according to one embodiment.

FIG. 2 illustrates modules within the publishing system 130 for reconstructing a document. In one embodiment, document reconstruction is performed by an image extractor 205, a text extractor 210, a text coalescence module 215, and a table of contents optimizer 220. In other embodiments, the publishing system 130 may include different and/or additional modules. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

The image extractor 205 identifies graphical objects within a page and determines their respective regions and bounding boxes. In one embodiment, the image extraction process performed by the image extractor 205 first identifies graphical operations within the page. For example, a path object in a PDF page may include multiple path construction operators that describe vector graphics made up of lines, rectangles, and curves.

The image extractor 205 extracts metadata associated with each of the images in the document page, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The image extractor 205 also determines the position information of each image. The position information of the images can be used to provide page fidelity when rendering the document pages in eReading browser applications, especially for complex documents containing multiple images per page. The image extractor 205 may also extract a caption associated with each image that defines the content of the image by searching for key words, such as "Picture", "Image", and "Tables", from text around the image in the original page. The extracted image metadata for the page may be stored to the overall document metadata and indexed by the page number.

The image extractor 205 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

The text extractor 210 extracts text and embedded fonts from the original document and identifies the location of the text elements on each page. In one embodiment, the text extractor 210 determines a Unicode character mapping for each glyph in a document to be reconstructed. The mapping ensures that no two glyphs are mapped to a same Unicode character. To achieve this goal, the text extractor 210 defines and follows a set of rules including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, the text extractor 210 may apply pattern recognition techniques on the rendered font to identify Unicode characters. If pattern recognition is still unsuccessful, the text extractor 210 may map the unrecognized characters into the private use area (PUA) of Unicode. In this case, the semantics of the characters are not identified, but the encoding uniqueness is guaranteed. As such, rendering ensures fidelity to the original document.

The text extractor 210 tags the pages in the original document having text. In one embodiment, the text extractor 210 identifies all the pages with one or more text objects in the original document. Alternatively, the text extractor 210 may mark only the pages without any embedded text.

The text extractor 210 extracts text from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. The text extractor 210 may also extract embedded fonts from the original document, which are stored and referenced by client devices for rendering the text content.

The output of the text extractor 210 is, therefore, a dataset referenced by the page number, comprising the characters and glyphs in a Unicode character mapping with associated location information and embedded fonts used in the original document.

The text coalescence module 215 coalesces the text characters extracted by the text extractor 210. In one embodiment, the text coalescing module 310 assembles the extracted text characters into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, the text coalescence module 215 assembles extracted text characters into words based on spacing. The text coalescence module 215 may analyze the spacing between adjacent characters and compare the spacing to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

The text coalescence module 215 may additionally or alternatively assemble extracted text characters into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the text coalescence module 215 analyzes the same text by both spacing and semantics, so that word grouping results may be verified and enhanced.

The text coalescence module 215 assembles words into lines by determining an end point of each line of text. Based on the text direction, the text coalescence module 215 computes and averages the horizontal spacing between words. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, the text coalescence module 215 assembles lines into paragraphs. Based on the text direction, the text coalescence module 215 may compute and average the vertical spacing between consecutive lines. The end of the paragraph may have a vertical spacing that is larger than the average. Additionally or alternatively, the text coalescence module 215 may apply semantic analysis to relate syntactic structures of phrases and sentences, so that meaningful paragraphs can be formed.

The text coalescence module 215 assembles the identified paragraphs into bounding boxes or regions. In one embodiment, the paragraphs may be analyzed based on lexical rules associated with the corresponding language of the text. The text coalescence module 215 may execute a semantic analyzer to identify punctuation at the beginning or end of a paragraph. For example, a paragraph may be expected to end with a period. If the end of a paragraph does not have a period, the paragraph may continue either on a next column or a next page. The text coalescence module 215 may analyze the syntactic structures of the paragraphs to determine the text flow from one paragraph to the next, and may combine two or more paragraphs based on the syntactic structure. If multiple combinations of the paragraphs are possible, the text coalescence module 215 may reference an external lexical database, such as WORDNET®, to determine which paragraphs are semantically similar.

The table of contents optimizer 220 indexes content of the reconstructed document. In one embodiment, the table of contents optimizer 220 aggregates the indexed content into a document-specific table of contents that describes the structure of the document at the page level. For example, when converting printed publications into electronic documents with preservation of page fidelity, it may be desirable to keep the digital page numbering consistent with the numbering of the original document pages.

The table of contents optimizer 220 may optimize different levels of the table. At the primary level, the table of contents optimizer 220 searches for chapter headings within the original document, such as headings for a preface, chapter numbers, chapter titles, an appendix, and a glossary. The table of contents optimizer 220 may identify a chapter heading based on the spacing between chapters. Alternatively, the table of contents optimizer 220 may identify a chapter heading based on the font face, including font type, style, weight, or size. For example, the headings may have a font face that is different from the font face used throughout the rest of the document. After identifying the headings, the table of contents optimizer 220 retrieves the number of the page on which each heading is located.

At a secondary level, the table of contents optimizer 220 searches for sub-chapter headings within the original document, such as dedications and acknowledgments, section titles, image captions, and table titles. The table of contents optimizer 220 may determine the vertical spacing between sections and segment each chapter according to the section spacing. Based on text at the beginning of each section, for example, the table of contents optimizer 220 identifies a sub-chapter heading font face. The table of contents optimizer 220 may parse each chapter to identify all occurrences of the sub-chapter heading font face, and determine the page number associated with each identified sub-chapter heading.

HTML5 eReading and e-Testing Environment

Figure 3:
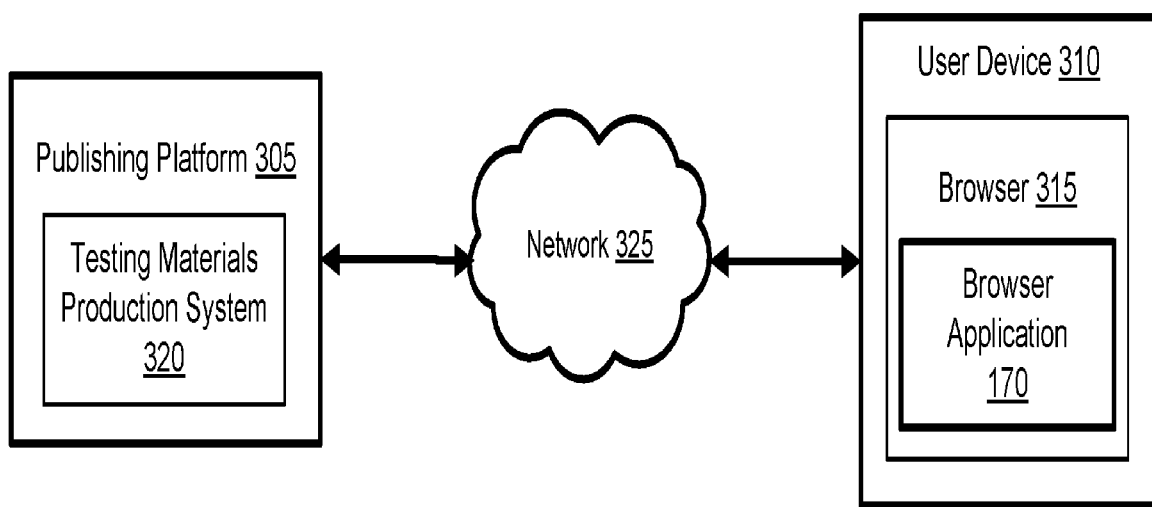
FIG. 3 illustrates an eReading and e-testing environment, according to one embodiment.

FIG. 3 illustrates an eReading and e-testing environment 300 including a publishing platform 305 and a user device 310. One user device 310 is illustrated in FIG. 3, but any number of user devices 310 may communicate with platform 305 to access the content distributed by platform 305. Each device 310 executes a web browser 315 and at least one browser application 170. In one embodiment, each user is associated with an account on the publishing platform 305, and content purchased by the user through the platform 305 is made available through the user account. In one embodiment, the user device 310 may also be registered to the account to authorize the device for accessing content. Alternatively, the publishing platform 305 may establish an authenticated web session on a device 310 when the user requests to access content of the platform 305 from the device 310. Furthermore, a user may access and interact with multilayered content synchronously on a plurality of devices 310. For example, a user may simultaneously use one or more devices 310, such as a desktop computer, a laptop, a smart phone, a tablet, an eReader, an Internet television, or any other device including computing functionality and data communication capabilities, to interact with a multilayered document distributed by the publishing platform 305.

Aspects of the publishing platform 305 may function similarly to the systems 120, 130, and 140 described with reference to the management block 102 of FIG. 1. The publishing platform 305 delivers multilayered content to the browser application 170 executing on the user device 310 through the network 325. The browser application 170 fetches content from the platform 305 in small increments, such as one page at a time. Alternatively, the user device 310 may cache one or more pages of the document to enable faster retrieval of the pages.

Contrary to other existing digital publishing services, the educational digital publication and reading platform of the present invention allows the user to access content without downloading a specific reading application from the publisher. Rather, the browser application 170, comprising client software compatible with the web browser 315, constructs document pages using structureless HTML5 elements. It should be noted that browser applications 170 comprise eReading applications as well as supplemental content applications that function in the browser environment to support the user's eReading activities and overall engagement with the multilayered documents distributed by the platform, such as notepad applications, social applications, testing applications, and advertising applications. In one embodiment, the browser application 170 integrates a number of a user's reading activities, including reading the content, navigating between pages, creating highlights, interacting with advertisements, generating social content, taking notes in relation to the content of the document, creating automated testing materials associated with a document, and interacting with the automated testing materials.

For example, the browser application 170 may upload user-generated content to the publishing platform 305. The uploaded user-generated content is stored and archived into the on-line end user account so that it may be synchronized across all registered devices 310 for a given end user. Thus, the end user's content can be accessed from any of the user's registered devices.

In one embodiment, the publishing platform 305 executes a testing materials production system 320 for generating customizable testing materials associated with a foundation document. The testing materials production system 320 generates a testing document by populating a template with testing elements extracted from a foundation document or associated with a testing document. In one embodiment, the testing document is a set of self-study materials generated by a user as a supplement to the foundation document. For example, a student may use the testing materials production system 320 to generate a set of flashcards associated with a textbook, including key terms of the textbook and their associated definitions. The student can study the flashcards to learn the definitions of the terms in the textbook. In another embodiment, the testing document is configured as an assessment to be used, for example, as part of an educational course. For example, an instructor of a course may use the testing materials production system 320 to generate a quiz to be delivered to students registered for the course. For sake of clarity herein, a user who authors or requests to create a testing document is referred to as an "instructor," while a user who receives and interacts with the generated testing document (e.g., takes the test) is referred to as a "student." However, the terms need not correspond to actual roles of the users in, for example, an educational course. A process executed by the testing materials production system 320 to generate a testing document is described in further detail below.

Communication between the publishing platform 305 and user device 310 is enabled by network 325. In one embodiment, the network 325 uses standard communications technologies and/or protocols. Thus, the network 325 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 325 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 325 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 325 can also include links to other networks such as the Internet.

Figure 4:
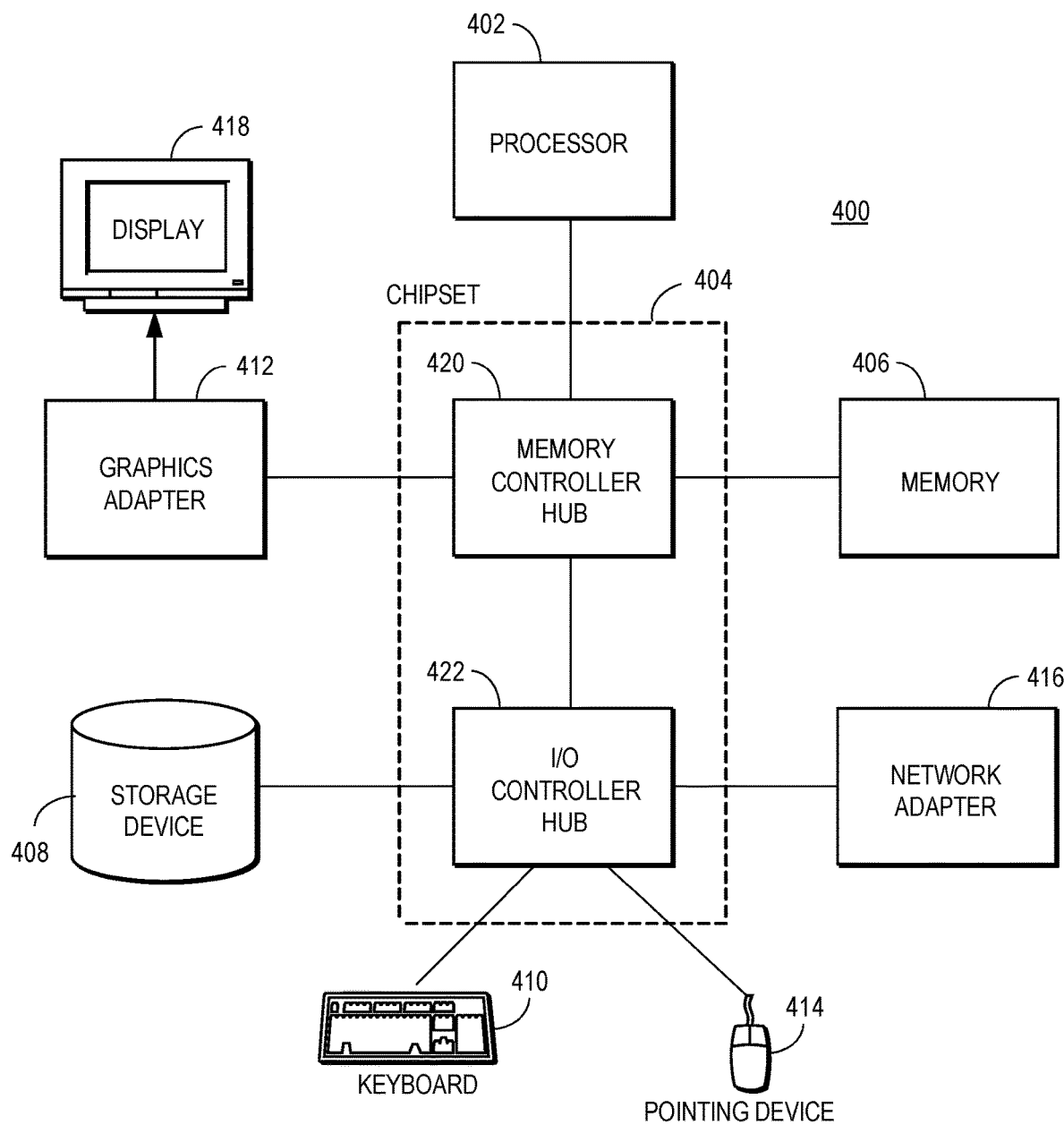
FIG. 4 is a high-level block diagram of a computer for use as a client device, according to one embodiment.

A high-level block diagram of a computer 400, as an example of a user device 310, is illustrated in FIG. 4. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer 400. The graphics adapter 412 displays images and other information on the display device 418. The network adapter 416 couples the computer 400 to a network. Some embodiments of the computer 400 have different and/or other components than those shown in FIG. 4. The types of computer 400 can vary depending upon the embodiment and the desired processing power. Other computing devices may alternatively be used as the user device 310, such as a tablet, a smart phone, an Internet television, or a gaming console.

Testing Materials Product System

Figure 5:
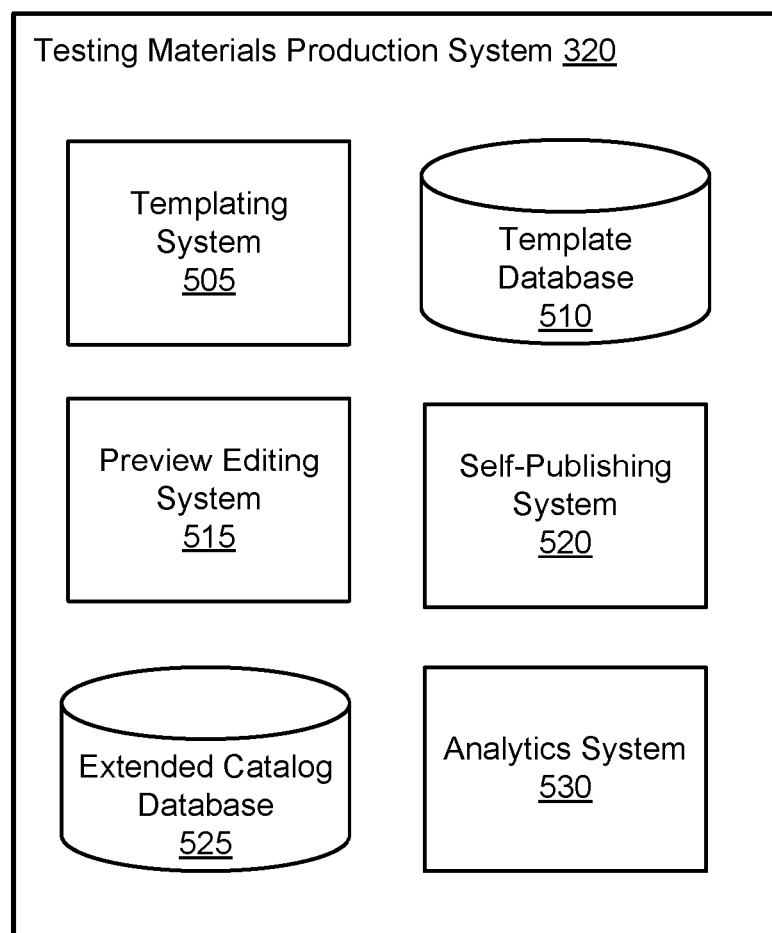
FIG. 5 is a block diagram illustrating modules within the terms listing production system, according to one embodiment.

FIG. 5 is a block diagram illustrating subsystems within the testing materials production system 320. In one embodiment, the testing materials production system 320 includes a template database 510, a templating subsystem 505, a preview editing subsystem 515, a self-publishing subsystem 520, an extended catalog database 525, and an analytics system 530. Other embodiments of the testing materials production system 320 may include fewer or more subsystems, and distribute the functionalities among the subsystems in a different manner.

The template database 510 stores one or more templates for generating testing materials. Each template is a formatted document with regions configured to receive content extracted from a foundation document, retrieved from an online source, added by a user, or otherwise generated. The regions may be arranged in one or more pages, where each page is a set of regions intended to be simultaneously displayed. Alternatively, the regions may be arranged in a panel that can be displayed, for example, adjacent to a page of the foundation document within a browser application 170. Furthermore, the regions may support different types of content. For example, regions may support static HTML content, text entry container regions, radio buttons, checkboxes, or hyperlinks. In one embodiment, the template database 510 stores templates configured for display on various categories of user devices. For example, a template configured for display on a smart phone may have a single region per page, whereas a template configured for display on a desktop computer may have multiple regions per page.

Various examples of templates that may be stored in the templates database 510 are illustrated in FIGS. 6A-D. As shown in FIG. 6A, templates may include regions for supporting various types of content, such as foundation document testing elements 602, user generated content 604, and advertising content 606. Foundation document testing elements 602 comprise elements of content extracted from a foundation document. In one embodiment, the testing elements 602 are primary terms and their associated primary definitions extracted from a glossary of the foundation document. User generated content 604 may comprise content added by the instructor who creates the testing document, or may be content generated by students who access the published testing document. Advertising content 606 comprises advertising creatives, logos, or other merchandizing content. FIG. 6B illustrates example formats of the regions of the templates, including a full-page component 610, a half-page component 612, a quarter page component 614, and a banner 616.

Using different combinations of supported content and region formats, numerous template layouts are possible. FIG. 6 illustrates two example layouts. FIG. 6C illustrates an example layout 620, which includes a full-page region and two banner regions on each page of the template. FIG. 6D illustrates an example layout 630, which includes two half-page regions and two banner regions on each page. Many other template layouts are possible.

Returning to FIG. 5, the templating subsystem 505 retrieves testing elements extracted from or associated with a foundation document, and populates templates from template database 510 with the testing elements by adding respective testing elements to regions of the template. A user, such as an instructor of an educational course, may select a template from the template database 510 for use by the templating subsystem 505. The instructor may also specify the foundation document from which the testing elements are to be extracted. Using the template and foundation document selected by the instructor, the templating subsystem 505 populates the regions of the template to generate an automated testing document.

In one embodiment, the testing elements are primary or secondary terms used in the foundation document and primary or secondary definitions associated with the terms. As used herein, a "primary term" is a term extracted from a glossary associated with a foundation document. Similarly, a "primary definition" is a definition extracted from the glossary and associated with a primary term. A "secondary term" is a term not originally appearing in a document's glossary, but associated with the document based on user or platform activities. "Secondary definitions" may be content, such as dictionary definitions or encyclopedia entries, associated with a primary or secondary term but not appearing in a foundation document's original glossary. Processes for extracting primary terms and definitions from a glossary, identifying secondary terms, and retrieving secondary definitions are described in U.S. patent application Ser. No. 13/783,974, filed Mar. 4, 2013, which is incorporated by reference in its entirety.

By populating regions of a template with the testing elements, the templating subsystem 505 generates an automated testing document associated with the foundation document. Each populated region of the testing document may be associated with attributes describing the foundation document with which the testing document is associated (e.g., the title, genre, author, copy information, table of contents structure) or attributes describing the instructor who created the testing document (e.g., the instructor's name, social graph information, course, institution). In one embodiment, the templating subsystem 505 may link a region populated with content extracted from the foundation document to the section of the document from which the content was extracted. For example, if a populated region contains a primary term appearing on page 5 of the foundation document, the templating subsystem 505 may link the region to page 5. If a student viewing the region via an browser application 170 clicks on the region, for example, the browser application 170 may retrieve and display page 5, enabling the student to view more information about the primary term. In one embodiment, the templating subsystem 505 generates links between two or more regions. For example, the templating subsystem 505 may link a region containing a primary term to a region containing the associated primary definition. If, for example, the testing document is a set of flashcards, the student can click on the region containing the term to retrieve the region containing the associated definition, enabling the student to study the flashcards and learn the terms.

The preview editing subsystem 515 displays the testing document to an instructor for previewing, editing, and customizing the testing document. For example, the instructor may customize the testing document by rearranging the order or layout of the populated regions of the testing document, or by adding user-generated content. In particular, the instructor may add user-generated content by manually entering content, importing user-generated notes into regions of the testing document, revising the regions generated by the templating subsystem 505, adding hyperlinks to locations within or external to the foundation document, or other activities. The preview editing subsystem 515 receives and stores the instructor's customizations to the testing document.

If an instructor is generating the testing document to be a quiz or other scored assessment of students, the preview editing subsystem 515 may enable the instructor to generate one or more problems using the populated regions. For example, a "problem" may be a question presented through a region, with the region configured to receive users' responses to the question. For example, the problem may comprise a term to be defined. The region may include multiple definitions and radio buttons for users to select the correct definition for the term.

The self-publishing subsystem 520 may publish the testing document as a layer of the foundation document that can be added to the overall content catalog of the publishing platform 305. In one embodiment, the self-publishing subsystem 520 adds the testing document to an extended catalog database 525 associated with the foundation document. The self-publishing subsystem 520 indexes the populated regions of the testing document, and stores the testing document in the extended catalog database 525 for distribution to students through browser applications 170 by distribution system 140. To publish the testing document, the instructor may specify parameters defining when, to whom, and how the testing document is to be delivered. The instructor may associate the regions of the testing document with one or more delivery conditions. For example a delivery condition may specify a time at which students are to receive access to a region, or a delivery condition may specify a particular location in the associated foundation document for delivering a testing document, such as the end of section. For example, the instructor may specify that the testing document is to be delivered on March 14 at 1:59 PM within eReading sessions of an "Intro to Geometry" textbook. As another example, the instructor may specify that the testing document is to be delivered when a student finishes reading page 265 of the associated foundation document.

Figure 7:
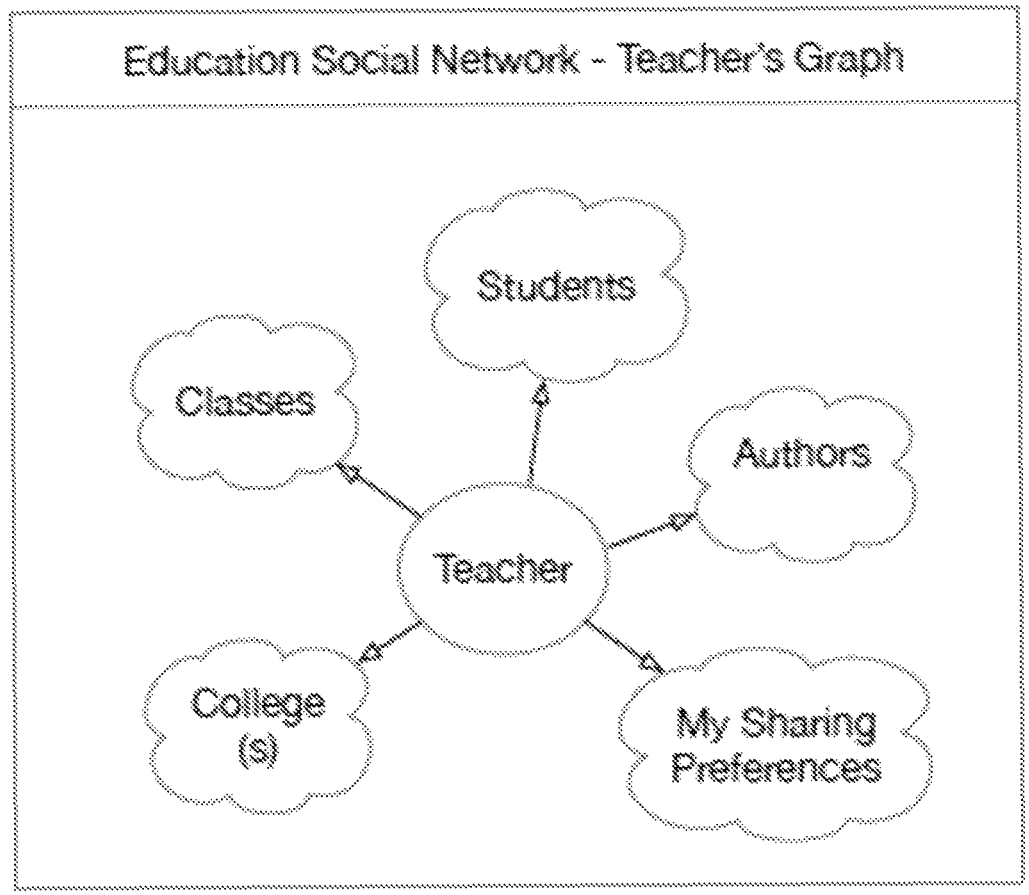
FIG. 7 illustrates a teacher's social graph, according to one embodiment.

The instructor may also specify which readers of a foundation document are to be granted access to the associated testing document. In one embodiment, self-publishing subsystem 520 leverages the instructor's social graph connections for determining students to whom access is to be granted. An instructor's social graph is illustrated in FIG. 7, as an example of a social graph that may be leveraged by the self-publishing system 520. For example, an instructor of a course and the students registered to the course may be connected to one another in an educational social graph. The instructor may generate a testing document as part of the course and designate all students registered to the course as recipients of the testing document. Alternatively, the instructor may specify different recipients for different regions of the testing document. For example, the instructor may deliver one set of regions to students having grades in the top 25 percent for the course, a different set of regions for the next 25 percent, and so forth. The self-publishing subsystem 520 may associate the respective regions of the testing document with attributes identifying the students to whom access to the regions is to be granted, based on the recipients specified by the instructor.

The regions of the testing document may be delivered to the designated recipients based on the delivery conditions specified by the instructor (or other user) via the distribution system 140. In one embodiment, the regions are delivered in association with the foundation document. For example, the regions may be displayed in a pop-up window within an browser application 170 as the recipient is accessing the foundation document, or displayed in a panel adjacent to a document page. Alternatively, the regions may be interleaved into the foundation document, or overlaid on a page of the foundation document.

As the recipients access and interact with the testing document, analytics system 530 of the testing materials production system 320 receives reports from the browser applications 170 of the students. For testing documents configured to be a scored assessment of students, the analytics system 530 may receive reports of the students' answers to the problems of the testing document and automatically calculate a score for each student.

In one embodiment, the analytics system 530 maintains a log of students' answers to problems associated with a foundation document, and uses the log for analysis of trends over a period of time and across a spectrum of readers of the foundation document. For example, the analytics system 530 may determine, based on the percentage of students who correctly solved particular problems, which testing elements are more challenging or simpler to the students. The analytics system 530 may determine the complexity of the testing elements by applying a machine learning model to the records in the log, identifying whether a testing element is relatively challenging (e.g., most students incorrectly answer problems relating to the testing element) or relatively simple (e.g., most students correctly answer problems relating to the testing element). In one embodiment, the self-publishing system 520 may leverage the complexity as calculated by the analytics system 530 to determine which students are to receive which regions of a testing document. For example, if regions are delivered according to grades of the students in a course, the self-publishing system 520 may designate the regions containing more challenging problems for delivery to the highest-scoring students, and designate the regions containing easier problems for delivery to lower-scoring students.

Producing Automated Testing Materials

Figure 8:
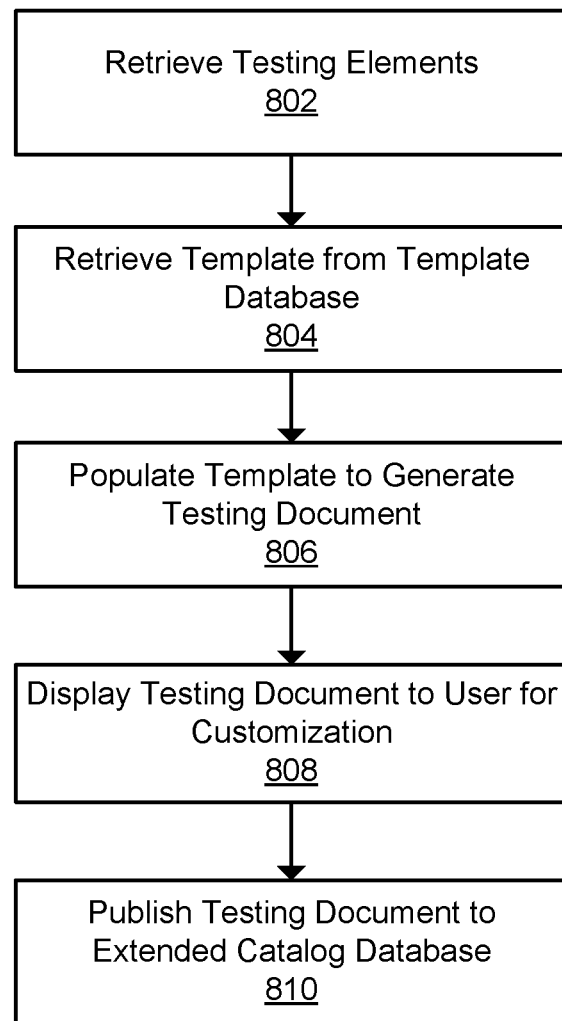
FIG. 8 is a flowchart illustrating a process for generating testing documents, according to one embodiment.

FIG. 8 is a flowchart illustrating a process for generating automated testing materials. In one embodiment, the steps of the process are performed by the testing materials production system 320. Other embodiments perform the illustrated steps in different orders, and/or perform different or additional steps. Moreover, some of the steps may be performed by modules other than the testing materials production system 320.

The process illustrated in FIG. 8 may be initiated by a user, such as an instructor of an educational course, communicating with the testing materials production system 320 via a browser application 170 executing on the user's device 310. Responsive to the instructor's request to generate a testing document associated with a foundation document, the testing materials production system 320 retrieves 802 testing elements extracted from the foundation document. In one embodiment, the testing elements are primary terms and their associated primary definitions as extracted from a glossary of the foundation document. In one embodiment, the testing materials production system 320 also retrieves 802 additional testing elements associated with the foundation document, such as secondary terms, secondary definitions, and user-generated notes.

The testing materials production system 320 retrieves 804 a template from the template database 510. In one embodiment, the template is selected by the instructor based on the type of content to be included in the testing document (e.g., primary terms and advertising content) or the form factor of target end-user devices (e.g., desktop computers). The template may include a plurality regions organized in a page-based structure, with one or more regions of various possible formats per page. Alternatively, the template may include regions organized in a panel that may be displayed adjacent to a page of the foundation document. Regions of the template may be configured to support different types of content, such as foundation document testing elements, user-generated content, or advertising content.

The testing materials production system 320 populates 806 the template with the retrieved testing elements by adding the testing elements to respective regions of the template. In populating the template, the testing materials production system 320 may associate each region with attributes describing the foundation document or the instructor. The testing materials production system 320 may also generate links between populated regions if appropriate, such as a link between a primary term and its associated primary definition. By populating 806 the template, the testing materials production system 320 generates an automated testing document associated with the foundation document.

The testing materials production system 320 displays 808 the testing document to the instructor to enable the instructor to preview, customize, and validate the document. Customization may include rearranging the order of the populated regions in the testing document, removing regions, and adding new regions populated with user-generated content. The instructor may also specify one or more students to whom the regions of the testing document are to be delivered and one or more delivery conditions. When the instructor has completed the customization activities and/or validated the automated testing document, the testing materials production system 320 publishes 810 the testing document to an extended catalog database associated with the foundation document.

Figure 9:
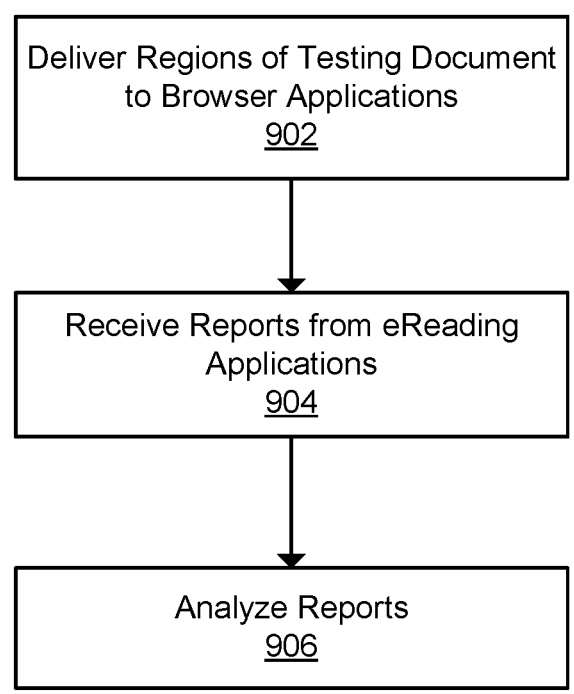
FIG. 9 is a flowchart illustrating a process for delivering testing documents to students, according to one embodiment.

FIG. 9 illustrates a process for delivering the testing document to students. When the delivery conditions specified by the instructor have been met, the testing materials production system 320 delivers 902 regions of the testing document to browser applications 170 of the specified recipients. The regions may include problems to be solved by the recipients. As the recipients interact with the testing document, the testing materials production system 320 may receive 904 reports from the browser applications 170 regarding, for example, responses of the recipients to the problems set forth in each delivered region. The testing materials production system 320 may analyze 906 the reports to assess each recipient's understanding of the concepts and, over time, quantify the complexity of the concepts associated with each testing element.

Embodiments of the testing materials production system 320 as described herein beneficially provide customizable testing documents associated with foundation documents. For example, if the testing document is a set of flashcards, the testing document can support the user's study and understanding of the foundation document. If the testing document is a scored assessment (e.g., a quiz) to be used in an educational course, the testing materials production system 320 provides a convenient mechanism for instructors to generate and customize the quiz, distribute the quiz to the students registered for the course, and receive assessments of each individual student as well as large scale trends.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for delivering a testing document associated with an electronic document, the electronic document configured for rendering by each browser application that is from a plurality of browser applications and that is configured to be executed on a client device from a set of client devices associated with a respective user from a plurality of users, the method comprising:
   extracting, from the electronic document, a set of testing elements, wherein the electronic document includes at least one of a plurality of content layers, wherein the plurality of content layers includes related content, advertising content, social content, and user-generated content, and wherein the extracting the set of testing elements includes extracting from the at least one of the plurality of content layers;
   populating a template with the set of testing elements to generate the testing document, the template including a plurality of available regions and the testing document including a plurality of regions each populated with a testing element from the set of testing elements, wherein the regions of the testing document are configured for delivery to the plurality of users through the plurality of browser applications in association with the electronic document;
   associating a set of delivery conditions with the regions of the testing document, the delivery conditions including a specified location in the electronic document at which one or more regions of the testing document are to be delivered to the plurality of users;
   storing the testing document and the associated delivery conditions in an extended catalog database associated with the electronic document;
   sending at least a portion of the electronic document for display to a user from the plurality of users by a browser application from the plurality of browser applications executing on a client device of the user from the plurality of users; and
   responsive to the user from the plurality of users accessing the specified location in the electronic document associated with regions of the testing document, modifying a display of the electronic document to display one or more of the regions of the testing document to the user from the plurality of users in association with the electronic document.

2. The method of claim 1, wherein each testing element from the set of testing elements includes primary terms and primary definitions associated with the primary terms, the primary terms and primary definitions extracted from a glossary associated with the electronic document, and wherein populating the template includes:
   populating a first region of the template with a primary term and a second region with a primary definition associated with the primary term; and
   linking the first region to the second region.

3. The method of claim 1, further comprising:
   identifying additional testing elements extracted from content associated with the electronic document; and
   populating additional regions of the template with the additional testing elements.

4. The method of claim 3, wherein the additional testing elements are secondary terms and secondary definitions associated with the electronic document.

5. The method of claim 3, wherein the additional testing elements are user-generated notes associated with the electronic document.

6. The method of claim 1, further comprising:
   receiving a user input to modify content of one or more regions from the plurality of regions of the testing document; and
   storing one or more modified regions in association with the testing document, the one or more modified regions modified based on the user input.

7. The method of claim 1, wherein modifying the display of the electronic document to display the one or more of the regions of the testing document includes:
   displaying the one or more of the regions of the testing document as an overlay on the electronic document at the specified location.

8. The method of claim 1, further comprising:
   determining, by applying a machine learning model to the log, the complexity of each testing element from the set of testing elements; and
   determining, based on the complexity of each testing element from the set of testing elements, the specified location in the electronic document at which one or more regions of the testing document are to be delivered.

9. The method of claim 1, further comprising:
   determining a location in the electronic document from which a testing element from the set of testing elements was extracted;
   linking a region from the plurality of regions of the testing document populated with the testing element from the set of testing elements to the determined location to produce a link; and
   responsive to a user selecting the testing element from the set of testing elements, displaying a portion of the electronic document including the determined location using the link.

10. A non-transitory computer-readable storage medium storing computer program instructions for delivering a testing document associated with an electronic document, the electronic document configured for rendering by each browser application that is from a plurality of browser applications and that is configured to be executed on a client device from a set of client devices associated with a respective user from a plurality of users, the computer program instructions comprising instructions for:
   extracting, from the electronic document, a set of testing elements, wherein the electronic document includes at least one of a plurality of content layers, wherein the plurality of content layers includes related content, advertising content, social content, and user-generated content, and wherein the extracting the set of testing elements includes extracting from the at least one of the plurality of content layers;
   populating a template with the set of testing elements to generate the testing document, the template including a plurality of available regions and the testing document including a plurality of regions each populated with a testing element from the set of testing elements, wherein the regions of the testing document are configured for delivery to the plurality of users through the plurality of browser applications in association with the electronic document;
   associating a set of delivery conditions with the regions of the testing document, the delivery conditions including a specified location in the electronic document at which one or more regions of the testing document are to be delivered to the plurality of users;
   storing the testing document and the associated delivery conditions in an extended catalog database associated with the electronic document;

sending at least a portion of the electronic document for display to a user from the plurality of users by a browser application from the plurality of browser applications executing on a client device of the user from the plurality of users; and responsive to the user from the plurality of users accessing the specified location in the electronic document associated with regions of the testing document, modifying a display of the electronic document to display one or more of the regions of the testing document to the user from the plurality of users in association with the electronic document.

11. The non-transitory computer readable storage medium of claim 10, wherein each testing element from the set of testing elements includes primary terms and primary definitions associated with the primary terms, the primary terms and primary definitions extracted from a glossary associated with the electronic document, and wherein populating the template includes:

populating a first region of the template with a primary term and a second region with a primary definition associated with the primary term; and linking the first region to the second region.

12. The non-transitory computer readable storage medium of claim 11, the instructions further comprising instructions for:

identifying additional testing elements extracted from content associated with the electronic document; and populating additional regions of the template with the additional testing elements.

13. The non-transitory computer readable storage medium of claim 12, wherein the additional testing elements are secondary terms and secondary definitions associated with the electronic document.

14. The non-transitory computer readable storage medium of claim 12, wherein the additional testing elements are user-generated notes associated with the electronic document.

15. The non-transitory computer readable storage medium of claim 11, the instructions further comprising instructions for:

receiving a user input to modify content of one or more regions from the plurality of regions of the testing document; and storing one or more modified regions in association with the testing document, the one or more modified regions modified based on the user input.

16. The non-transitory computer readable storage medium of claim 11, wherein the instructions for modifying the display of the electronic document to display the one or more of the regions of the testing document include instructions for:

displaying the one or more of the regions of the testing document as an overlay on the electronic document at the specified location.

17. The non-transitory computer readable storage medium of claim 11, the instructions further comprising instructions for:

determining, by applying a machine learning model to the log, the complexity of each testing element from the set of testing elements; and determining, based on the complexity of each testing element from the set of testing elements, the specified location in the electronic document at which one or more regions of the testing document are to be delivered.

18. The non-transitory computer readable storage medium of claim 11, the instructions further comprising instructions for:

determining a location in the electronic document from which a testing element from the set of testing elements was extracted;

linking a region from the plurality of regions of the testing document populated with the testing element from the set of testing elements to the determined location to produce a link; and responsive to a user selecting the testing element from the set of testing elements, displaying a portion of the electronic document including the determined location using the link.

\* \* \* \* \*